United States Patent
Lin et al.

(10) Patent No.: US 9,595,093 B2
(45) Date of Patent: Mar. 14, 2017

(54) METHOD FOR DETECTING ALIGNMENT FILM AND DEVICE FOR THE SAME

(71) Applicant: BEIJING BOE OPTOELECTRONICS TECHNOLOGY CO., LTD., Beijing (CN)

(72) Inventors: Haiyun Lin, Beijing (CN); Qinghui Zhao, Beijing (CN); Chengtan Zhao, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 18 days.

(21) Appl. No.: 14/132,634

(22) Filed: Dec. 18, 2013

(65) Prior Publication Data
US 2014/0212019 A1    Jul. 31, 2014

(30) Foreign Application Priority Data
Jan. 30, 2013  (CN) .......................... 2013 1 0036694

(51) Int. Cl.
G06K 9/00 (2006.01)
G06T 7/00 (2006.01)

(52) U.S. Cl.
CPC .. G06T 7/0004 (2013.01); *G06T 2207/30121* (2013.01)

(58) Field of Classification Search
None
See application file for complete search history.

(56) References Cited

U.S. PATENT DOCUMENTS

| | | | | |
|---|---|---|---|---|
| 6,137,575 A | * | 10/2000 | Sugiyama | G01B 11/0625 356/493 |
| 6,313,898 B1 | * | 11/2001 | Numano | G02F 1/133753 349/129 |
| 7,289,233 B2 | * | 10/2007 | Kurokawa | G01B 11/0633 250/559.27 |
| 2001/0033688 A1 | * | 10/2001 | Taylor | 382/181 |
| 2003/0125479 A1 | * | 7/2003 | Kinsho et al. | 525/403 |
| 2007/0116350 A1 | * | 5/2007 | Cheverton | G06T 7/0004 382/151 |
| 2010/0188623 A1 | * | 7/2010 | Nakagawa | G02F 1/133753 349/96 |

(Continued)

*Primary Examiner* — Sumati Lefkowitz
*Assistant Examiner* — Ryan P Potts
(74) *Attorney, Agent, or Firm* — Ladas & Parry LLP

(57) ABSTRACT

A method for detecting an alignment film coated on a substrate of a liquid crystal panel comprises: obtaining an image of an alignment film test region of a substrate; and analyzing continuity of the alignment film along an internal boundary of the alignment film test region in the image obtained. since the alignment film test region is located outside an active display area of the substrate, when the alignment film along the internal boundary of the alignment film test region is determined as continuous, it can be determined that all the edges of the alignment film are outside the active display area, then a Haro region which might appear on the edge of the alignment film may also be located outside the active display area, so as to ensure uniform thickness of the alignment film in the active display area of the substrate.

11 Claims, 3 Drawing Sheets

(56) References Cited

U.S. PATENT DOCUMENTS

2012/0152899 A1\* 6/2012 Shih .................... C23C 4/12
   216/67
2012/0224132 A1\* 9/2012 Hayama ............... G02F 1/1309
   349/153

\* cited by examiner

METHOD FOR DETECTING ALIGNMENT FILM AND DEVICE FOR THE SAME

TECHNICAL FIELD

The present disclosure relates to the field of manufacturing process of liquid crystal display, and more particularly, to a method for detecting alignment film and device for the same.

BACKGROUND

In the prior art, a Thin Film Transistor-Liquid Crystal Display (TFT-LCD) is manufactured as follows: forming a cell by a Color Film (CF) substrate and a Thin Film Transistor (TFT) Array substrate and filling liquid crystal molecules between two substrates. In order to arrange liquid crystal molecules along a certain direction to obtain a liquid crystal panel with uniform brightness, high contrast and fast response time, a layer of alignment liquid is needed to be coated on the CF substrate and the TFT-Array substrate, so as to form a uniform alignment film; then the alignment film on the substrate is rubbed by a rubbing cloth, by which grooves are formed on the surface of the alignment film, so that the liquid crystal molecules will be arranged regularly along the groove direction.

In the actual production operations, due to limitation of solid resin (Asahikasei Photosensitive Resin APR) transfer printing technology, the alignment liquid will flow along the printing direction and spread all around when the alignment liquid is printed on the substrate, resulting in ununiform thickness of the alignment film formed and excessive thickness at the edge, i.e., an alignment liquid accumulation (Haro) region will be generated at the edge. In the Haro region, the liquid crystal molecules are not correctly oriented; therefore, the Haro region should not appear in an active display region of the substrate; further, the Haro region which appears in the active display area will cause negative effects such as an increased liquid crystal cell gap and foreign matter interfusing, which severely affects display quality of a liquid crystal panel.

Currently, when specifically implemented, the edge position of the alignment film is enlarged to the external of the active display area so as to avoid possibility that the Haro region may appear in the active display area. In addition, after the alignment film precuring process has been completed, it is generally required to determine whether the edge position of the alignment film is located outside the active display area in a manual detection mode. However, a manual detection renders error, low accuracy, and longer time consumption, which may bring about issue of decreased production efficiency of liquid crystal display panel.

SUMMARY

The embodiments of the present disclosure provide a method for detecting alignment film and device for the same, to solve the problems of low accuracy and time consumption of a manual detection.

A method for detecting alignment film provided by an embodiment of the present disclosure, includes:

obtaining an image of an alignment film test region of a substrate, wherein, the alignment film test region is an annular region with edges of an active display area of the substrate as an internal boundary thereof;

analyzing continuity of the alignment film along the internal boundary of the alignment film test region in the image obtained; and determining thickness of the alignment film in the active display area of the substrate as uniform, when the alignment film along the internal boundary of the alignment film test region in the image is determined as continuous.

A device for detecting alignment film provided by an embodiment of the present disclosure, includes:

an image obtaining module, for obtaining an image of an alignment film test region of a substrate; wherein, the alignment film test region is an annular region with edges of an active display area of the substrate as an internal boundary thereof;

an analyzing module, for analyzing continuity of the alignment film along the internal boundary of the alignment film test region in the image obtained; and determining thickness of the alignment film in the active display area of the substrate as uniform, when the alignment film along the internal boundary of the alignment film test region in the image is determined as continuous.

A precuring apparatus provided by an embodiment of the present disclosure includes the above device for detecting alignment film provided by the embodiment of the present disclosure.

The advantageous effects of the present disclosure can be as follows:

The embodiments of the present disclosure provide a method for detecting alignment film and a device for the same. The method includes: obtaining an image of an alignment film test region of a substrate, wherein, the alignment film test region is an annular region with edges of the active display area of the substrate as an internal boundary thereof; and analyzing continuity of the alignment film along the internal boundary of the alignment film test region in the image obtained. since the alignment film test region is located outside the active display area of the substrate, when the alignment film along the internal boundary of the alignment film test region is determined as continuous, it can be determined that all the edges of the alignment film are outside the active display area, then, the Haro region which might appear on the edge of the alignment film may also be outside the active display area, so as to ensure uniform thickness of the alignment film in the active display area of the substrate. Compared with a manual detecting method, the method for detecting alignment film provided in the embodiments of the present disclosure can improve accuracy rate of alignment film detection, save time, and promote production efficiency of liquid crystal display panel.

DETAILED DESCRIPTION

The implementations for carrying out a method for detecting alignment film and device for the same provided by the embodiments of the present disclosure are further described in detail hereinafter in conjunction with the accompanying drawings.

Figure 1:
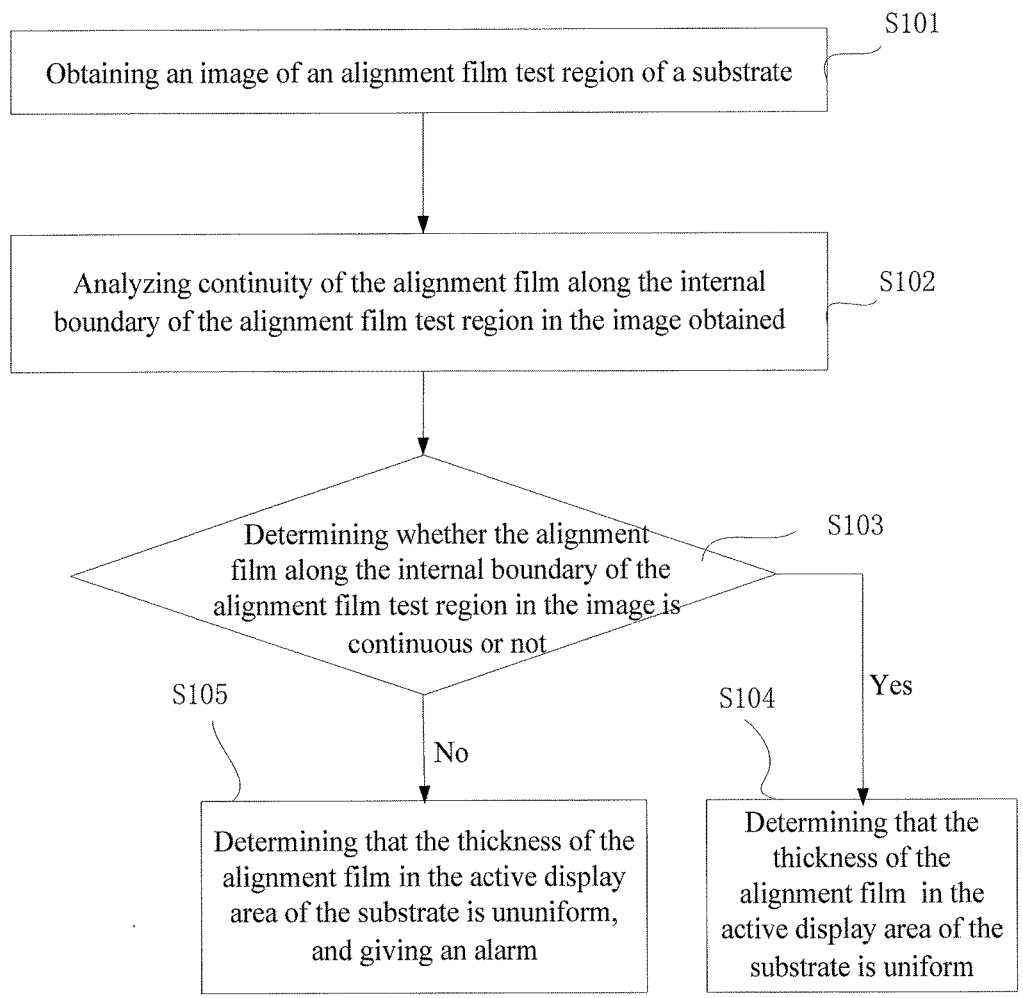
FIG. 1 is a schematic flow diagram of a method for detecting alignment film according to an embodiment of the present disclosure.

The method for detecting alignment film provided by an embodiment of the present disclosure, as shown in FIG. 1, specifically includes steps of:

S101: obtaining an image of an alignment film test region of a substrate, wherein, the alignment film test region is an annular region with the edges of the active display area of the substrate as the internal boundary thereof;

S102: analyzing continuity of the alignment film along the internal boundary of the alignment film test region in the image obtained;

S103: determining whether the alignment film along the internal boundary of the alignment film test region in the image is continuous or not; when the alignment film along the internal boundary of the alignment film test region in the image is determined as continuous, step S104 is executed;

S104: determining that the thickness of the alignment film in the active display area of the substrate is uniform.

Further, in an actual implementation, as shown in FIG. 1, when the alignment film along the internal boundary of the alignment film test region is determined as discontinuous, step S105 may also be executed;

S105: determining that the thickness of the alignment film in the active display area of the substrate is ununiform, and giving an alarm.

Specifically, in the above method provided in the embodiment of the present disclosure, the alignment film test region is defined as the annular region with the edges of the active display area of the substrate as the internal boundary thereof. The annular region has a same ring width along four edges of the active display area; alternatively, the ring widths may also be set to be different from each other according to actual demands, and there is no limitation on this herein. Certainly, the alignment film test region may be either the whole region except the active display area on the substrate, or part of the region except the active display area on the substrate, and there is no limitation on this herein.

Figure 2A:
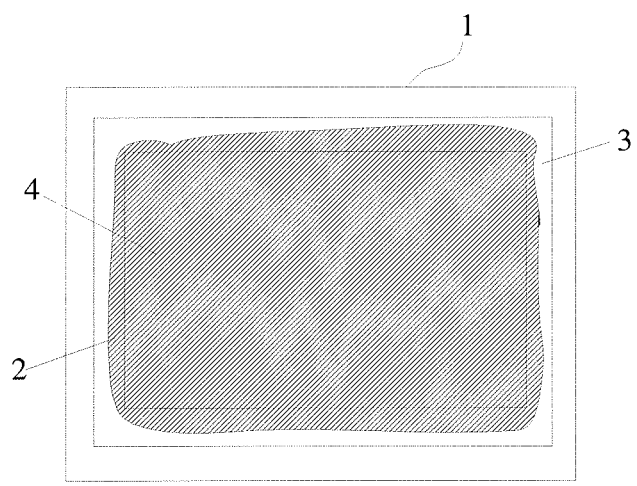
FIGS. 2a-2C are schematic distribution diagrams of an alignment film on the substrate according to an embodiment of the present disclosure.
Figure 2B:
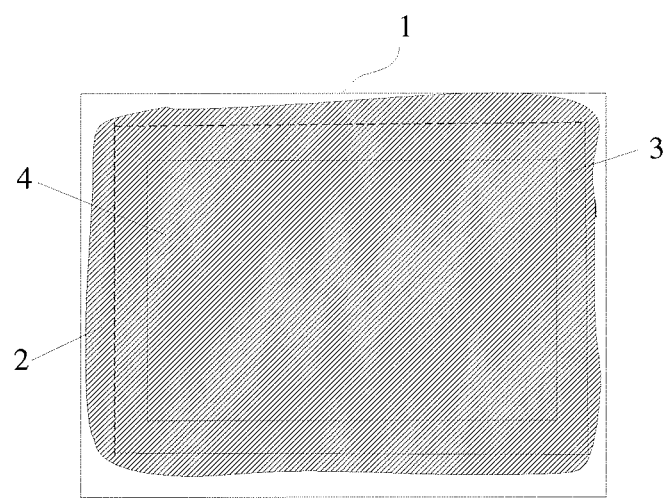
Figure 2C:
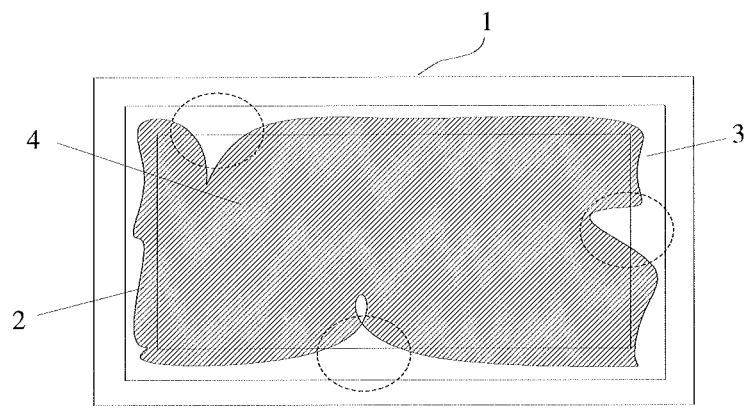

Specifically, when alignment liquid is printed on a substrate 1, as shown in FIGS. 2a-2c, the alignment liquid will flow along the printing direction and spread all around to form an alignment film 2. Specifically, distribution of the alignment film 2 on the substrate 1 may present a variety of situations. Then, in step S102, continuity of the alignment film along the internal boundary of the alignment film test region in the obtained image is analyzed, which is specified as: analyzing a relative position relationship between the alignment film and the internal boundary of the alignment film test region in the image obtained, with detailed explanation provided below.

First situation: as shown in FIG. 2a, the alignment film 2 along the internal boundary of an alignment film test region 3 is continuous, i.e., the alignment film 2 has no breakpoint in the alignment film test region 3. Since the alignment film test region 3 is located outside an active display area 4, it can be determined that all the edges of the alignment film 2 are outside the active display area 4. Then, the Haro region which might appear on the edge of the alignment film may also be outside of the active display area 4. Under such circumstance, when the alignment film in the image has no breakpoint along the internal boundary in the alignment film test region, it can be determined that the alignment film in the image along the internal boundary in the alignment film test region is continuous. Further, it can be determined that thickness of the alignment film 2 in the active display area 4 of the substrate 1 is uniform.

Second situation: as shown in FIG. 2b, all the edges of the alignment film 2 are outside the alignment film test region 3, i.e., the alignment film 2 covers the whole alignment film test region 3. Now, it may also be deemed that the alignment film 2 along the internal boundary of the alignment film test region 3 is continuous. Since the alignment film test region 3 is located outside the active display area 4, it can be determined that all the edges of the alignment film 2 are outside of the active display area 4. That is, the Haro region which might appear on the edge of the alignment film may also be outside the active display area 4. Under such circumstance, when the alignment film in the image has no breakpoint along the internal boundary in the alignment film test region, it can be determined that the alignment film in the image along the internal boundary in the alignment film test region is continuous. Further, it can be also determined that thickness of the alignment film 2 in the active display area 4 of the substrate 1 is uniform.

Third situation: as shown in FIG. 2c, the alignment film 2 along the internal boundary of the alignment film test region 3 is discontinuous, i.e., part of the edges of the alignment film 2 are within the active display area 4, i.e., the alignment film 2 has a plurality of breakpoints along the internal boundary in the alignment film test region 3 (as shown by the circular dotted line in the drawing); then, the Haro region may exist at the edge of the alignment film 2 located in the active display area 4, which results in ununiform thickness of the alignment film 2 in the active display area 4 of the substrate 1; that is, when the alignment film in the image has breakpoints along the internal boundary in the alignment film test region, it is determined that the alignment film in the image along the internal boundary in the alignment film test region is discontinuous.

Furthermore, the alignment film may be located completely within the active display area, but there is no alignment film in the image obtained. That is, when there is no alignment film in the image, it is determined directly that the alignment film along the internal boundary in the alignment film test region is discontinuous.

It can be seen from the above situations that, in the method for detecting alignment film according to the embodiment of the present disclosure, by detecting the distribution of the alignment film in the alignment film test region 3 outside the active display area 4, i.e., determining whether the alignment film 2 along the internal boundary of the alignment film test region 3 is continuous or not, it can be determined whether the Haro region which might appear on the edge of the alignment film is outside the active display area 4 or not, so as to determine whether the thickness of the alignment film 2 within the active display area 4 of the substrate 1 is uniform or not.

Optionally, in actual implementation, the step S101 for obtaining the image of the alignment film test region of the substrate, may be carried out in a mode specifically in which images of respective parts of the alignment film test region of the substrate are obtained by at least one camera. Certainly, the actual implementation of an image obtaining module is not limited to a camera. Other tools which can obtain images may also be adopted, such as CCD and the like, and there is no limitation on this herein.

When step S101 is specifically carried out, a camera may be used to obtain the whole image of the alignment film test region of the substrate. The alignment film test region may also be divided into two parts (according to the principle of no overlap and no omission when dividing), and two cameras are used to obtain an image of each part of the alignment film test region respectively, which will be combined in a subsequent analyzing module. Certainly, more than two cameras may also be used to obtain images of respective parts of the alignment film test region, and there is no limitation on this herein.

Optionally, in actual implementation, the operation in step S101 may be performed simultaneously when the alignment film on the substrate is being precured; alternatively, step S101 may also be performed when the substrate is being inspected after the alignment film on the substrate has been precured, and there is no limitation on this herein.

Specifically, as for the precuring process of the substrate which has been coated with an alignment film, by using the above method for detecting alignment film according to the embodiment of the present disclosure, the alignment film is detected simultaneously when the precuring process is performed, which can save overall production time and promote production efficiency of liquid crystal display panel, as compared with detection of an alignment film after the precuring process has been completed.

Based on a same inventive concept, an embodiment of the present disclosure provides A device for detecting alignment film. Since the principle for the device to solve problem is similar to that for the above method for detecting alignment film, the implementation of the device may be referred to that of the method, which is not repeated herein.

Figure 3:
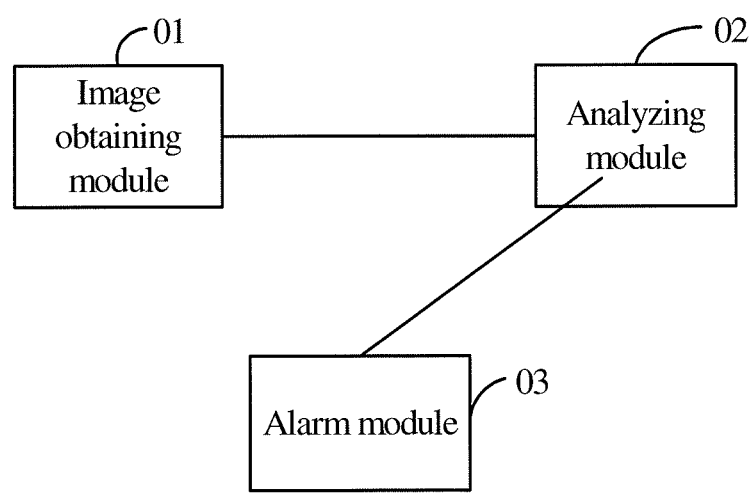
FIG. 3 is a schematic structural diagram of a device for detecting alignment film according to an embodiment of the present disclosure.

The device for detecting alignment film according to the embodiment of the present disclosure, as shown in FIG. 3, includes:

An image obtaining module 01, for obtaining an image of an alignment film test region of a substrate; wherein, the alignment film test region is an annular region with the edges of the active display area of the substrate as the internal boundary thereof;

An analyzing module 02, for analyzing continuity of the alignment film along the internal boundary of the alignment film test region in the image obtained, and determining that a thickness of the alignment film in the active display area of the substrate is uniform, when the alignment film along the internal boundary of the alignment film test region in the image is determined as continuous.

Further, the above device for detecting alignment film provided by the embodiment of the present disclosure, as shown in FIG. 3, may further include an alarm module 03;

wherein, the analyzing module 02 notifies the alarm module 03, when determining the alignment film is discontinuous, and thereby determining the thickness of the alignment film in the active display area of the substrate as ununiform;

The alarm module 03, for giving an alarm when receiving a notification from the analyzing module 02.

In actual implementation, the alarm module 03 may correspond to the image obtaining module 01 one to one; or a plurality of image obtaining modules 01 may correspond to one alarm module 03; and it is certainly not limited thereto.

Further, in the above device for detecting alignment film provided by the embodiment of the present disclosure, the analyzing module 02 is specifically used for analyzing a relative position relationship between the alignment film and the internal boundary of the alignment film test region in the image obtained; when the alignment film in the image has no breakpoint along the internal boundary in the alignment film test region, it can be determined that the alignment film in the image along the internal boundary in the alignment film test region is continuous; when the alignment film in the image has breakpoints along the internal boundary in the alignment film test region, or when there is no alignment film in the image, it is determined that the alignment film along the internal boundary in the alignment film test region is discontinuous.

Optionally, in actual implementation, the image obtaining module 01 may be either at least one camera, or other tools which can obtain images, such as CCD and the like, and there is no limitation on this herein.

Further, the image obtaining module 01 is specifically used for obtaining the image of an alignment film test region of a substrate simultaneously when the alignment film on the substrate is precured.

Based on a same inventive concept, an embodiment of the present disclosure also provides a precuring apparatus which includes the above device for detecting alignment film provided by the embodiment of the present disclosure. Since the principle for the apparatus to solve problem is similar to that for the above device for detecting alignment film, the implementation of the precurring apparatus may be referred to that of the device for detecting alignment film, which is not repeated herein.

With descriptions of the above embodiments, those ordinary skill in the art can clearly understand that the above embodiments of the present disclosure can be carried out by hardware, as well as by software in combination with necessary hardware platform. Based on such understanding, the technical solutions of the embodiments of present disclosure may be embodied in the form of a software product, which can be stored in a nonvolatile storage medium (such as a CD-ROM, a U-key, and a mobile hard disk), including instructions to enable a computer device (which may be a personal computer, a server or a network device) to execute the method according to the embodiments of the present disclosure.

It may be understood by those skilled in the art that the drawings are merely schematic diagrams of exemplary embodiments, while the modules or flow therein may not be necessary to implement the present disclosure.

It may be understood by those skilled in the art that the modules of the device can be distributed in the device in the embodiment as described herein, or can be changed correspondingly to be located in one or more devices different from that in the embodiment. The modules in the above embodiment can be combined into one module, or can be further separated into a plurality of sub-modules.

The serial numbers of the embodiments of present disclosure are only adopted for description, which do not represent priority of the embodiments.

The embodiments of the present disclosure provide a method for detecting alignment film and device for the same. The method includes: obtaining an image of an alignment film test region of a substrate, wherein, the alignment film test region is an annular region with the edges of the active display area of the substrate as the internal boundary thereof; and analyzing continuity of the alignment film along the internal boundary of the alignment film test region in the image obtained. Since the alignment film test region is outside the active display area of the substrate, when the alignment film along the internal boundary of the alignment film test region is determined as continuous, it can be determined that all the edges of the alignment film are outside the active display area. Then, the Haro region which might appear at the edge of the alignment film may also be outside the active display area, so as to ensure uniform thickness of the alignment film in the active display area of the substrate. Compared with a manual detecting method, the method for detecting alignment film provided in the embodiments of the present disclosure can improve accuracy rate of alignment film detection, save time, and promote production efficiency of liquid crystal display panel.

It is evident that one person skilled in the art can make various changes or modifications to the embodiments of the present disclosure without departing from the spirit and scope of the present disclosure. Thus, if these changes and modifications to the embodiments of the present disclosure are within the scope of the claims of the present disclosure and equivalent technologies, the present disclosure also intends to include all such changes and modifications within its scope.

What is claimed is:

1. A method for detecting alignment film coated on a substrate of a liquid crystal panel, comprising:
   obtaining an image of an alignment film test region of the substrate, wherein, the alignment film test region is an annular region with edges of an active display area of the substrate as an internal boundary of the alignment film test region; and
   analyzing continuity of the alignment film along the internal boundary of the alignment film test region in the image obtained so as to determine whether thickness of the alignment film in the active display area of the substrate is uniform;
   wherein if the alignment film along the internal boundary of the alignment film test region in the image has no breakpoint, the alignment film along the internal boundary of the alignment film test region in the image is determined as continuous and the thickness of the alignment film in the active display area of the substrate is determined as uniform, and
   wherein the no breakpoint indicates that the active display area of the substrate is coated entirely by the alignment film.

2. The method according to claim 1, further comprising: determining the thickness of the alignment film in the active display area of the substrate as ununiform, and giving an alarm, if the alignment film along the internal boundary of the alignment film test region is determined as discontinuous.

3. The method according to claim 2, wherein, the analyzing continuity of the alignment film along the internal boundary of the alignment film test region in the image obtained comprises:
   analyzing a relative position relationship between the alignment film and the internal boundary of the alignment film test region in the image obtained;
   determining the alignment film along the internal boundary of the alignment film test region as discontinuous comprises: determining the alignment film along the internal boundary of the alignment film test region as discontinuous, if the alignment film along the internal boundary of the alignment film test region in the image has a breakpoint, or there is no alignment film in the image.

4. The method according to claim 1, wherein, the image of the alignment film test region of the substrate is obtained simultaneously when the alignment film on the substrate is being precured.

5. The method according to claim 1, wherein, the obtaining the image of the alignment film test region of the substrate comprises:
   obtaining images of respective parts of the alignment film test region of the substrate by using at least one camera.

6. A device for detecting alignment film, comprising:
   an image obtaining module, for obtaining by at least one camera, an image of a test region of an alignment film coated on a substrate of a liquid crystal panel;
   wherein, the alignment film test region is an annular region with edges of an active display area of the substrate as an internal boundary of the alignment film test region; and
   an analyzing module, for analyzing by a processor continuity of the alignment film along the internal boundary of the alignment film test region in the image obtained so as to determine whether thickness of the alignment film in the active display area of the substrate is uniform;
   wherein if the alignment film along the internal boundary of the alignment film test region in the image has no breakpoint, the alignment film along the internal boundary of the alignment film test region in the image is determined as continuous and the thickness of the alignment film in the active display area of the substrate is determined as uniform, and
   wherein the no breakpoint indicates that the active display area of the substrate is coated entirely by the alignment film.

7. The device according to claim 6, further comprising: an alarm module;
   wherein, if the analyzing module determines that the alignment film along the internal boundary of the alignment film test region is discontinuous, and thus determines the thickness of the alignment film in the active display area of the substrate as ununiform, the analyzing module notifies by the processor the alarm module;
   the alarm module, for giving by the processor an alarm when receiving a notification from the analyzing module.

8. The device according to claim 7, wherein, the analyzing module is configured to analyze by the processor a relative position relationship between the alignment film and the internal boundary of the alignment film test region in the image; wherein if the alignment film along the internal boundary of the alignment film test region in the image has a breakpoint, or there is no alignment film in the image, the alignment film along the internal boundary of the alignment film test region is determined as discontinuous.

9. The device according to claim 6, wherein, the image obtaining module is configured to obtain by the processor the image of the alignment film test region of the substrate simultaneously when the alignment film on the substrate is being precured.

10. The device according to claim 6, wherein, the image obtaining module obtains images of respective parts of the alignment film test region of the substrate by the at least one camera.

11. A precuring apparatus, comprising the device for detecting alignment film according to claim 6.

* * * * *